(12) United States Patent
Hou et al.

(10) Patent No.: US 12,341,918 B2
(45) Date of Patent: Jun. 24, 2025

(54) SUPPORT STRUCTURAL MEMBER AND DISPLAY DEVICE

(71) Applicant: KunShan Go-Visionox Opto-Electronics Co., Ltd., Jiangsu (CN)

(72) Inventors: Hongqi Hou, Kunshan (CN); Liwei Ding, Kunshan (CN); Fu Liao, Kunshan (CN); Yuhua Wu, Kunshan (CN); Zhaoji Zhu, Kunshan (CN); Kanglong Sun, Kunshan (CN)

(73) Assignee: KunShan Go-Visionox Opto-Electronics Co., Ltd., Kunshan (CN)

( * ) Notice: Subject to any disclaimer, the term of this patent is extended or adjusted under 35 U.S.C. 154(b) by 279 days.

(21) Appl. No.: 18/167,344

(22) Filed: Feb. 10, 2023

(65) Prior Publication Data

US 2023/0188631 A1    Jun. 15, 2023

Related U.S. Application Data

(63) Continuation of application No. PCT/CN2021/115913, filed on Sep. 1, 2021.

(30) Foreign Application Priority Data

Nov. 2, 2020   (CN) .......................... 202011205103.3

(51) Int. Cl.
  *G06F 1/16*    (2006.01)
  *G09F 9/30*    (2006.01)
  *H04M 1/02*    (2006.01)

(52) U.S. Cl.
  CPC ........ *H04M 1/0268* (2013.01); *G06F 1/1652* (2013.01); *G09F 9/301* (2013.01); *H04M 1/0216* (2013.01)

(58) Field of Classification Search
  CPC ..... G06F 1/1652; H04M 1/0268; G09F 9/301
  See application file for complete search history.

(56) References Cited

U.S. PATENT DOCUMENTS

| 10,534,402 B1 | 1/2020 | Kim et al. |
| 2005/0045077 A1 | 3/2005 | Bober |

(Continued)

FOREIGN PATENT DOCUMENTS

| CN | 101431915 A | 5/2009 |
| CN | 102902308 A | 1/2013 |

(Continued)

OTHER PUBLICATIONS

Extended Search Report issued on Feb. 1, 2024, in corresponding European Application No. 21884678.0, 11 pages.

(Continued)

*Primary Examiner* — Adrian S Wilson
(74) *Attorney, Agent, or Firm* — Maier & Maier, PLLC

(57) ABSTRACT

A support structural member and a display device. The support structural member comprises a support frame, a screen body fixture, a screen body connector and a power assembly. The support frame comprises a first support body and a second support body movably connected to the first support body in a first direction. The screen body fixture is connected to the first support body. The screen body connector is configured to guide a screen body to be unfolded or folded. The screen body connector is movably connected to the second support body. The second support body and the screen body connector are both connected to the power assembly, the power assembly drives the second support body to protrude or retract relative to the first support body, and enables the screen body connector and the second support body to move simultaneously in the first direction.

18 Claims, 7 Drawing Sheets

(56) References Cited

U.S. PATENT DOCUMENTS

| | | |
|---|---|---|
| 2013/0058063 A1 | 3/2013 | O'Brien |
| 2018/0077808 A1 | 3/2018 | Seo et al. |
| 2019/0250669 A1 | 8/2019 | Liao et al. |
| 2020/0267851 A1* | 8/2020 | Hou ................ H05K 5/0226 |
| 2021/0373603 A1* | 12/2021 | Feng ................ G06F 1/1624 |
| 2022/0053654 A1* | 2/2022 | Hou ................ H05K 5/0217 |
| 2022/0361347 A1* | 11/2022 | Feng ................ G06F 1/1624 |

FOREIGN PATENT DOCUMENTS

| | | |
|---|---|---|
| CN | 203172255 U | 9/2013 |
| CN | 204265077 U | 4/2015 |
| CN | 107818735 A | 3/2018 |
| CN | 107820399 A | 3/2018 |
| CN | 108173995 A | 6/2018 |
| CN | 108322567 A | 7/2018 |
| CN | 207977988 U | 10/2018 |
| CN | 207977992 U | 10/2018 |
| CN | 108922408 A | 11/2018 |
| CN | 208112673 U | 11/2018 |
| CN | 208353382 U | 1/2019 |
| CN | 208673636 U | 3/2019 |
| CN | 110572497 A | 12/2019 |
| CN | 110767091 A | 2/2020 |
| CN | 110838264 A | 2/2020 |
| CN | 210639895 U | 5/2020 |
| CN | 210640917 U | 5/2020 |
| CN | 111243440 A | 6/2020 |
| CN | 111277690 A | 6/2020 |
| CN | 111508372 A | 8/2020 |
| CN | 111508374 A | 8/2020 |
| CN | 111510536 A | 8/2020 |
| CN | 211423148 U | 9/2020 |
| CN | 211820363 U | 10/2020 |
| CN | 112309258 A | 2/2021 |
| JP | 2005309086 A | 11/2005 |
| JP | 2008512133 A | 4/2008 |
| JP | 2010178188 A | 8/2010 |
| JP | 2014531796 A | 11/2014 |
| JP | 2019537256 A | 12/2019 |
| KR | 1020060114996 A | 11/2006 |
| KR | 1020160141255 A | 12/2016 |
| KR | 1020200099455 A | 8/2020 |

OTHER PUBLICATIONS

Office Action issued on Mar. 5, 2024, in corresponding Japanese Application No. 2023-516834, 8 pages.

Search Report issued on Jan. 24, 2024, in corresponding Japanese Application No. 2023-516834, 50 pages.

Office Action issued on Feb. 5, 2024, in corresponding Korean Application No. 10-2023-7008154, 12 pages.

International Search Report, issued on Nov. 26, 2021, in corresponding International Patent Application No. PCT/CN2021/115913, 8 pages.

Office Action, issued on Feb. 7, 2022, in corresponding Chinese Patent Application No. 202011205103.3, 17 pages.

Office Action issued Oct. 21, 2024, in Korean Application No. 10-2023-7008154, 11 pages.

* cited by examiner

SUPPORT STRUCTURAL MEMBER AND DISPLAY DEVICE

CROSS REFERENCE TO RELATED APPLICATION

This is a Continuation Application of International Patent Application No. PCT/CN2021/115913 filed on Sep. 1, 2021, which claims the priority of Chinese Patent Application No. 202011205103.3, filed on Nov. 2, 2020, entitled "SUPPORT STRUCTURAL MEMBER AND DISPLAY DEVICE", both of which are incorporated herein by reference in their entireties.

TECHNICAL FIELD

This disclosure relates to the technical field of display, in particular to a support structural member and a display device.

BACKGROUND

With development of science and technology, mobile terminal devices have been widely used and become one of the basic supplies in human life. The mobile terminal devices have experienced the development process from small-scale screen to large-scale screen, but the screens of mobile terminal devices are fixed. However, when people handle different tasks, such as calling, game entertainment, document processing or the like, they often have different requirements for the size of the display screen. Therefore, the mobile terminal devices with unchangeable screen display area cannot meet the daily needs of people well.

SUMMARY

Embodiments of this disclosure provide a support structural member and a display device, which can change the size of a display area to meet the daily needs of people.

On one hand, an embodiment of this disclosure provides a support structural member for a display device. The support structural member includes: a support frame including a screen body support surface and an inner surface opposite to the screen body support surface, the support frame including a first support body and a second support body, and the second support body being movably connected to the first support body in a first direction; a screen body connector disposed on the support frame and configured to guide a screen body to be unfolded or folded, the screen body connector being movably connected to the second support body; and a power assembly disposed on the support frame, the second support body and the screen body connector being both connected to the power assembly, and the power assembly driving the second support body to protrude or retract relative to the first support body, and enabling the screen body connector and the second support body to move simultaneously in the first direction.

On the other hand, an embodiment of this disclosure also provides a display device, including: a flexible screen; and the support structural member in any of the previous embodiments, the screen body support surface being configured to support the flexible screen, one end of the flexible screen being connected to the screen body fixing member, and the other end of the flexible screen being bent to be received in the second support body and being connected to the screen body connector, the power assembly driving the second support body to protrude or retract relative to the first support body, and enabling a portion of the flexible screen received in the second support body to be unfolded or folded when the screen body connector and the second support body move simultaneously in the first direction.

The support structural member according to the embodiment of this disclosure can provide a mounting base for the flexible screen. After the support structural member and the flexible screen are assembled together, a display device with adjustable display area of the flexible screen can be formed. In the support structural member, the first support body and the second support body are movable relative to each other, thereby increasing or decreasing the unfolded area of the screen body support surface. The flexible screen is provided between the screen body fixing member and the screen body connector. The screen body fixing member and the screen body connector can jointly tension the flexible screen. The screen body connector is movable with the second support body in the first direction. When the second support body protrudes, the screen body connector moves away from the first support body to unfold the flexible screen, thereby increasing the display area of the flexible screen on a side of the screen body support surface. When the second support body retracts, the screen body connector moves close to the first support body to fold the flexible screen, thereby decreasing the display area of the flexible screen on a side of the screen body support surface. The power assembly can drive the second support body and the screen body connector to move in the first direction. In this way, the support structural member according to the embodiment of this disclosure can freely adjust the size of the area of the screen body support surface, and accordingly can adjust freely the size of the display area of the flexible screen after the support structural member and the flexible screen are assembled together, thereby satisfying the different needs of users for the size of the display area in different use scenarios, and improving the experience satisfaction of users.

DETAILED DESCRIPTION

In order to better understand this disclosure, embodiments of this disclosure are described below in combination with FIGS. 1 to 9.

Figure 1:
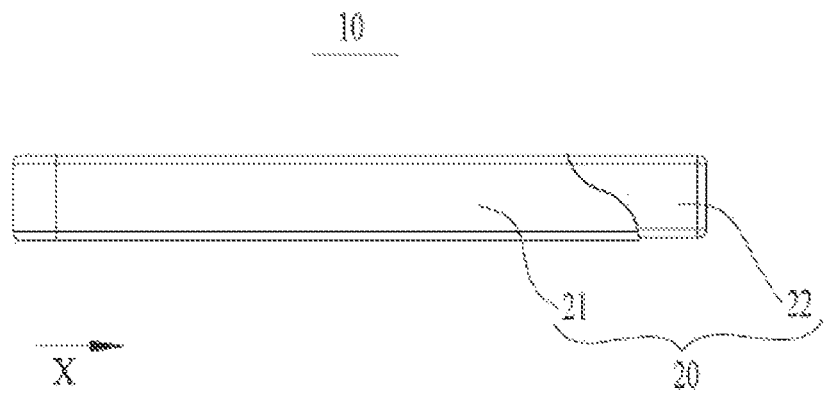
FIG. 1 is a schematic side view of an initial state of a support structural member according to an embodiment of this disclosure.
Figure 2:
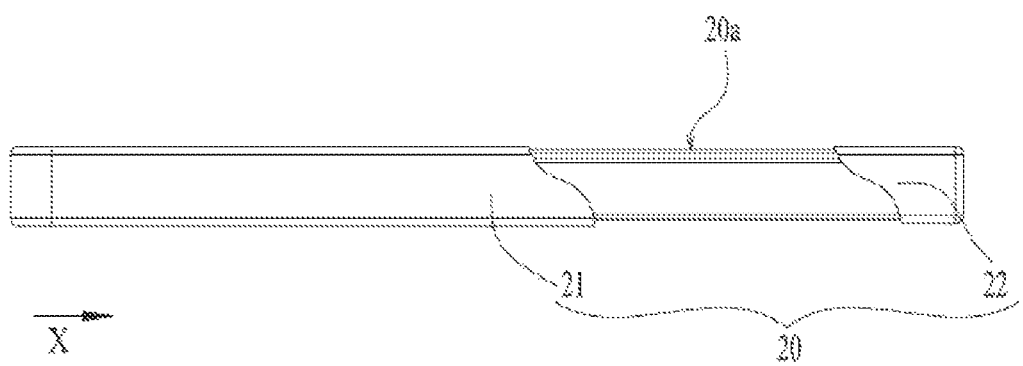
FIG. 2 is a schematic side view of an open state of a support structural member according to an embodiment of this disclosure.

As shown in FIGS. 1 and 2, an embodiment of this disclosure provides a support structural member 10 for a display device. The support structural member 10 can provide a mounting base for a flexible screen 100. By way of example, the flexible screen 100 refers to a screen body that can be bent or curled.

Figure 3:
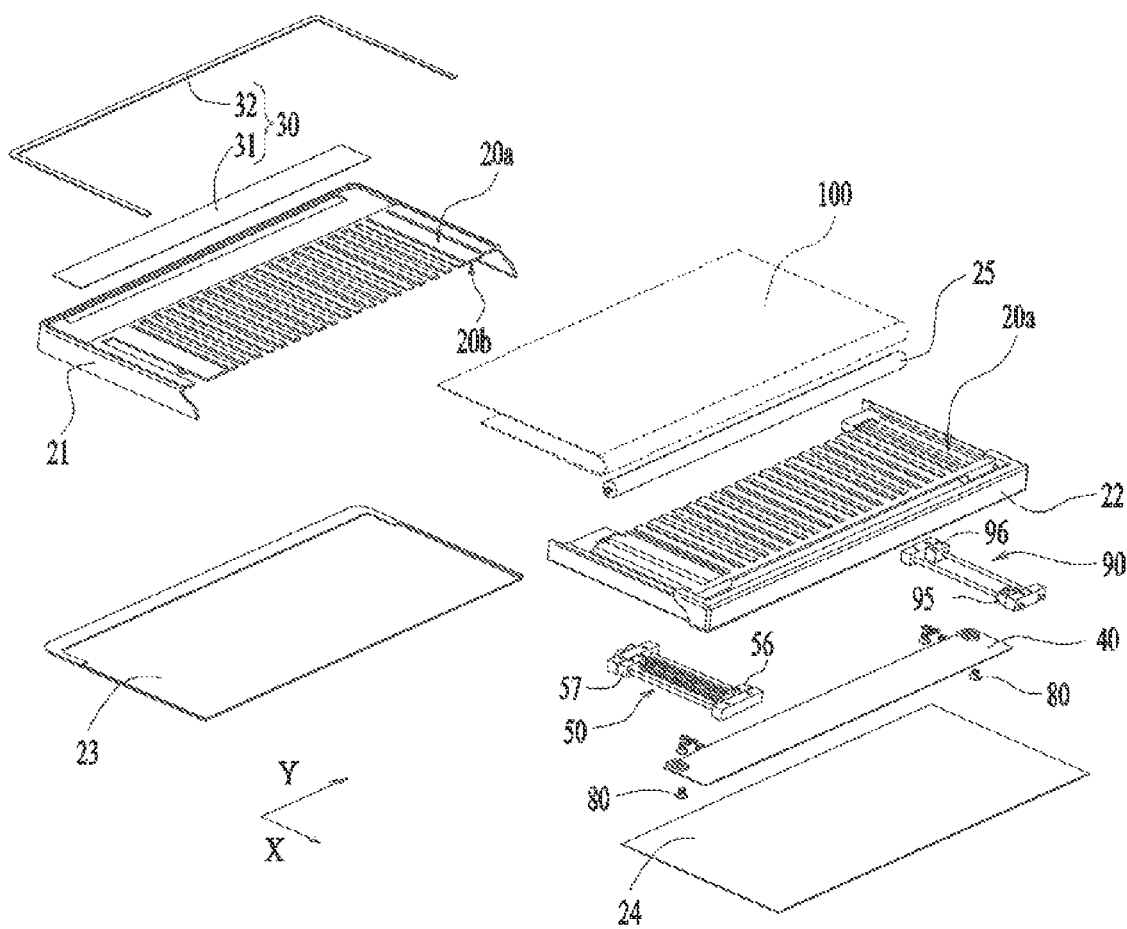
FIG. 3 is a schematic exploded view of a partial structure of a support structural member according to an embodiment of this disclosure.

As shown in FIGS. 1 to 3, the support structural member 10 according to the embodiment of this disclosure includes a support frame 20, a screen body fixing member 30, a screen body connector 40 and a power assembly 50. The support frame 20 includes a screen body support surface 20a and an inner surface 20b. The screen body support surface 20a is configured to support the flexible screen 100 and to ensure the flatness of the flexible screen 100. The inner surface 20b is disposed opposite to the screen body support surface 20a. By way of example, when a user uses a display device including the support structural member 10, the screen body support surface 20a is a surface that faces the user.

The support frame 20 includes a first support body 21 and a second support body 22. The second support body 22 is movably connected to the first support body 21 in the first direction X. When the second support body 22 is subjected to an external force, the second support body 22 can move in the first direction X, thereby protruding or retracting relative to the first support body 21. After the flexible screen 100 is mounted onto the support structural member 10, when the second support body 22 protrudes relative to the first support body 21, the unfolded area of the screen body support surface 20a will increase, so that the unfolded display area of the flexible screen 100 will correspondingly increase. When the second support body 22 retracts relative to the first support body 21, the unfolded area of the screen body support surface 20a will decrease, so that the unfolded display area of the flexible screen 100 will correspondingly decrease.

The screen body fixing member 30 is configured to fix the flexible screen 100. The screen body fixing member 30 is disposed on a side of the screen body support surface 20a of the support frame 20. The screen body fixing member 30 is connected to the first support body 21. One end of the flexible screen 100 may be connected and fixed to the screen body fixing member 30. The screen body fixing member 30 includes a fixing plate 31 connected with the first support body 21 and a fixing frame 32 connected with one end of the flexible screen 100. The fixing frame 32 is pressed against a side of the flexible screen 100 facing away from the first support body 21 and is connected with the first support body 21, to ensure the stability of the connection of the flexible screen 100 and reduce the possibility of wrinkles occurring on the flexible screen 100.

The screen body connector 40 is configured to connect and fix the flexible screen 100. The screen body connector 40 is disposed on a side of the inner surface 20b of the support frame 20, namely, is located inside the support frame 20. After the flexible screen 100 is mounted onto the support structural member 10, an end of the flexible screen 100 away from the screen body fixing member 30 is bent toward the inner surface 20b of the support frame 20 to be connected with the screen body connector 40, and is received inside the support frame 20. The screen body connector 40 and the screen body fixing member 30 can jointly stretch the flexible screen 100, to maintain the flatness of the flexible screen 100. When the second support body 22 protrudes relative to the first support body 21 in the first direction X, the screen body connector 40 also moves relative to the second support body 22 in the first direction X in a manner to release the flexible screen 100, enabling a portion of the flexible screen 100 located inside the support frame 20 to be exposed and supported onto a unfolded portion of the screen body support surface 20a, thereby increasing the display area of the flexible screen 100. When the second support body 22 retracts relative to the first support body 21 in the first direction X, the screen body connector 40 also moves relative to the second support body 22 in the first direction X in a manner to fold the flexible screen 100, enabling a portion of the flexible screen 100 located at the unfolded portion of the screen body support surface 20a to move to the inside of the support frame 20, thereby decreasing the display area of the flexible screen 100.

Referring to 2 to 6, the power assembly 50 is disposed on a side of the inner surface 20b of the second support body 22 of the support frame 20, namely, is received inside the second support body 22 and abuts against an inner wall 221 of the second support body 22. The second support body 22 and the screen body connector 40 are both connected with the power assembly 50. The power assembly 50 can drive the second support body 22 to protrude or retract relative to the first support body 21, and drive the screen body connector 40 and the second support body 22 to move in the first direction X.

The support structural member 10 according to the embodiment of this disclosure can provide a mounting base for the flexible screen 100. After the support structural member 10 and the flexible screen 100 are assembled together, a display device with adjustable display area of the flexible screen 100 can be formed. In the support structural member 10, the first support body 21 and the second support body 22 are movable relative to each other, thereby increasing or decreasing the unfolded area of the screen body support surface 20a. The screen body fixing member 30 and the screen body connector 40 are configured to fix and install the flexible screen 100 to jointly tension the flexible screen 100. The screen body connector 40 is movable with the second support body 22 in the first direction X. When the second support body 22 protrudes, the screen body connector 40 moves away from the first support body 21 to unfold the flexible screen 100, thereby increasing the display area of the flexible screen 100 on a side of the screen body support surface 20a. When the second support body 22 retracts, the screen body connector 40 moves close to the first support body 21 to fold the flexible screen 100, thereby decreasing the display area of the flexible screen 100 on a side of the screen body support surface 20a. The power assembly 50 can drive the second support body 22 and the screen body connector 40 to move in the first direction X. In this way, the support structural member 10 according to the embodiment of this disclosure can freely adjust the size of the area of the screen body support surface 20a, and accordingly can adjust freely the size of the display area of the flexible screen 100 after the support structural member 10 and the flexible screen 100 are assembled together, thereby satisfying the different needs of users for the size of the display area in different use scenarios, and improving the experience satisfaction of users.

In some embodiments, the support frame 20 further includes a first bottom plate 23 connected to outside of the first support body 21 and a second bottom plate 24 connected to outside of the second support body 22. The screen body connector 40 and the power assembly 50 are received in a space formed by the second bottom plate 24 and the second support body 22.

In some embodiments, the first support body 21 includes a plurality of first comb teeth. The second support body 22 includes a plurality of second comb teeth. The first support body 21 and the second support body 22 are connected by inserting the first comb teeth and the second comb teeth into each other, that is, each of the first comb teeth is inserted between two adjacent second comb teeth, and each of the second comb teeth is inserted between two adjacent first comb teeth.

Figure 4:
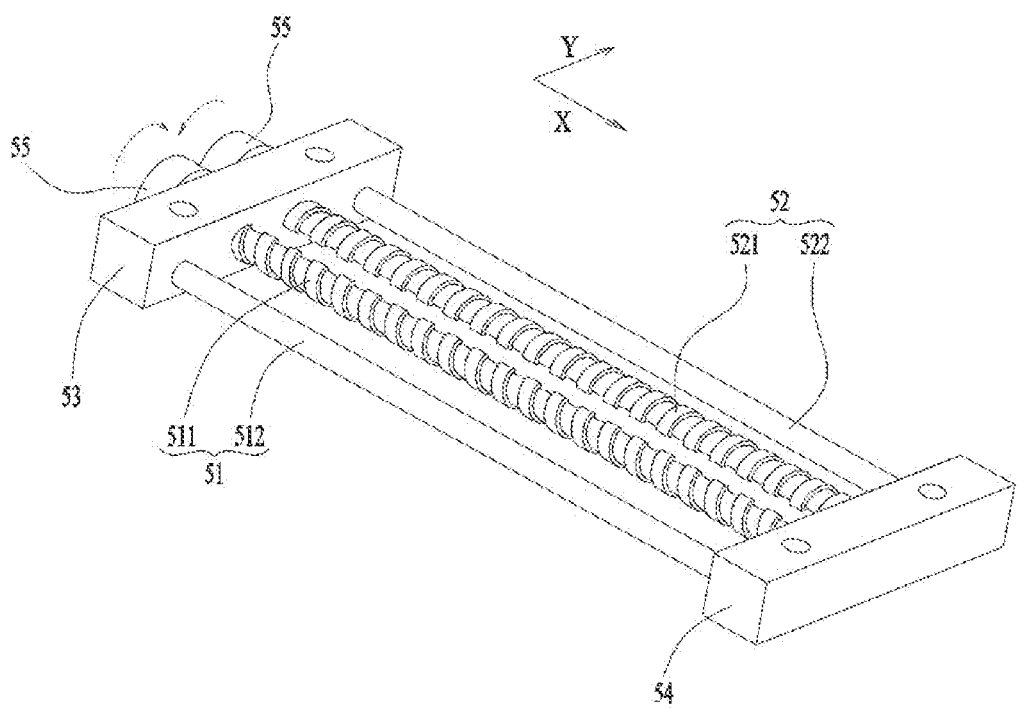
FIG. 4 is a schematic view of a power assembly according to an embodiment of this disclosure.

In some embodiments, as shown in FIGS. 3 and 4, the power assembly 50 includes a first driving mechanism 51 connected with the second support body 22 and a second driving mechanism 52 connected with the screen body connector 40. The power assembly 50 drives the second support body 22 and the screen body connector 40 to move in the first direction X by the first driving mechanism 51 and the second driving mechanism 52, respectively. In this way, the second support body 22 and the screen body connector 40 can be driven separately, so that respective movement of the second support body 22 and the screen body connector 40 are independent and do not interfere with each other.

In some embodiments, the first driving mechanism 51 includes a first threaded rod 511 extending along the first direction X, and the power assembly 50 further includes a first connecting seat 56 located at one end of the first driving mechanism 51 in the first direction X. The first connecting seat 56 includes a convex column fixedly connected with the first support body 21 and a first fixing hole 561 penetrating in a third direction perpendicular to the first direction X and the second direction Y Since the first support body 21 remains still, the first support body 21 is fixedly connected with the first connecting seat 56, and the first connecting seat 56 is threadly connected with the first threaded rod 511, when the first threaded rod 511 rotates relative to the second support body 22, the first threaded rod 511 and the second support body 22 will synchronously move relative to the first support body 21 in the first direction X, so as to protrude or retract the second support body 22 relative to the first support body 21. The rotation transmission by the first threaded rod 511 is beneficial to improve the stability of the movement of the second support body 22, reduce the instantaneous impact force on the flexible screen 100 caused by the impact existing during the movement of the second support body 22, thus reducing the possibility of tearing of the flexible screen 100 due to being subjected to the instantaneous impact force.

Figure 5:
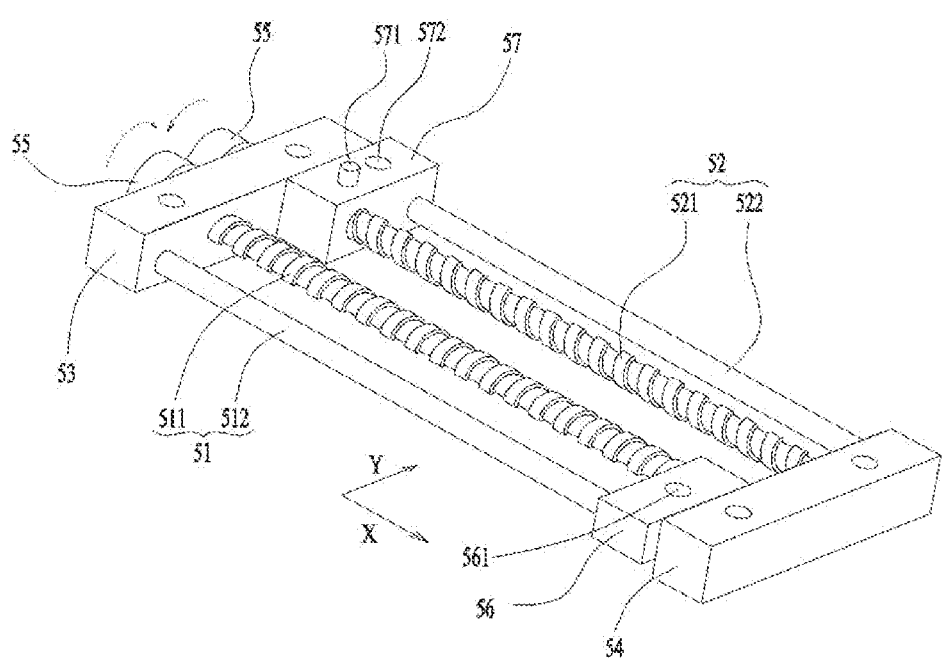
FIG. 5 is a schematic view of an assembling structure of a power assembly, a first connecting seat and a connector base according to an embodiment of this disclosure.

As shown in FIG. 5, the first threaded rod 511 is threadly connected with the first connecting seat 56. When the first threaded rod 511 rotates, the first threaded rod 511 is movable relative to the first connecting seat 56 in the first direction X, to drive the second support body 22 to move.

In some embodiments, as shown in FIGS. 3 to 9, the second driving mechanism 52 includes a second threaded rod 521 extending along the first direction X, the power assembly 50 further includes a second connecting seat 57 located at one end of the second driving mechanism 52 in the first direction X, and the second connecting seat 57 is threadly connected to the second threaded rod 521. The first connecting seat 56 and the second connecting seat 57 are located at two ends of the first driving mechanism 51 and the second driving mechanism 52 in the first direction X, respectively. The second connecting seat 57 includes a first limiting convex column 571 projecting toward the second bottom plate 24 and a second fixing hole 572 penetrating in the third direction. The third direction is perpendicular to a plane where the first direction X and the second direction Y are located.

The screen body connector 40 includes a first strip hole 41 and a second strip hole 42 at two ends in the second direction Y The support structural member 10 further includes a fastener 80 for fixing the screen body connector 40 and the power assembly 50 for the flexible screen 100. The fastener 80 penetrates through the first strip hole 41 of the screen body connector 40 and the second fixing hole 572 of the second connecting seat 57, so as to fixedly connect the screen body connector 40 and the second connecting seat 57, thereby preventing the screen body connector 40 from falling off and separating from the power assembly 50. The first limiting convex column 571 of the second connecting seat 57 is inserted into the second strip hole 42 of the screen body connector 40 and abuts against an inner wall of the second strip hole 42.

Figure 6:
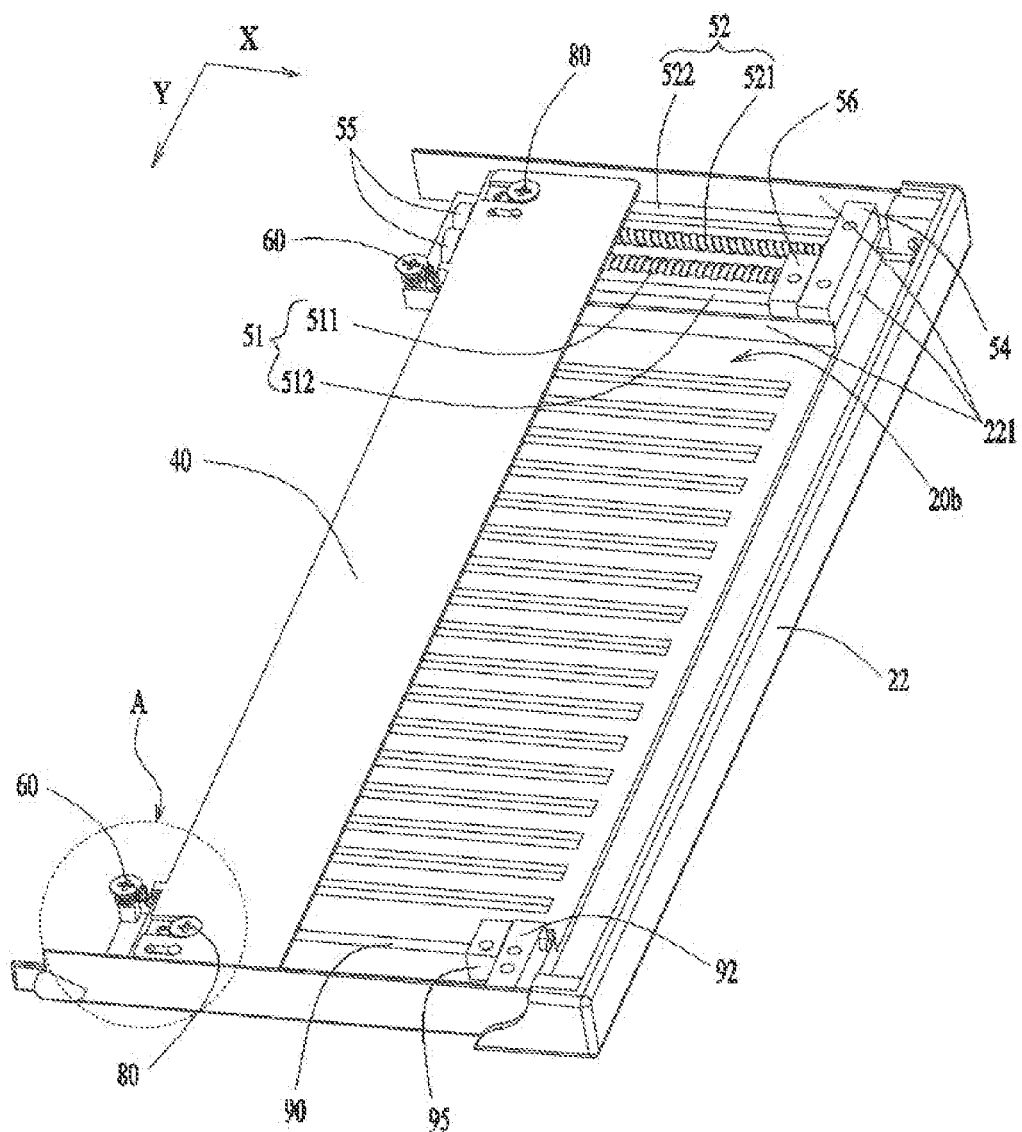
FIG. 6 is a schematic view of a partial structure of a support structural member according to an embodiment of this disclosure.

Referring to FIG. 6, the first strip hole 41 and the second strip hole 42 are disposed as a long and narrow hole-like structure extending along the first direction X, so the screen body connector 40 has the advantage of slightly adjusting its position, thereby enabling the flexible screen 100 to be tensioned at a predetermined level by slightly adjusting the position of the screen body connector 40. In this disclosure, the first strip hole 41 and the second strip hole 42 are spaced in the second direction Y.

The power assembly 50 further includes a first mounting seat 53 and a second mounting seat 54 which are fixedly connected with the second support body 22. The first mounting seat 53 and the second mounting seat 54 are disposed inside the second support body 22 and spaced in the first direction X. Two ends of each of the first threaded rod 511 and the second threaded rod 521 are connected to the first mounting seat 53 and the second mounting seat 54, respectively. The first threaded rod 511 and the second threaded rod 521 are spaced in the second direction Y The first direction X is perpendicular to the second direction Y The spacing between the first mounting seat 53 and the second mounting seat 54 in the first direction X may define a maximum movement amount of the second support body 22 and the screen body connector 40.

When the second threaded rod 521 rotates, the second threaded rod 521 drives the screen body connector 40 and the second support body 22 to move simultaneously in the first direction X. Since the first support body 21 remains still and the first connecting seat 56 also remains still due to being fixedly connected with the first support body 21, when the first threaded rod 511 rotates, the first threaded rod 511, the second threaded rod 521 and the second support body 22 move synchronously relative to the first support body 21 in the first direction X. When the second threaded rod 521 rotates, since the screen body connector 40 is fixedly connected with the second connector 57, the second threaded rod 521 drives the second connector 57 to move the screen body connector 40 relative to the second support body 22 in the first direction X. The rotation transmission by the first threaded rod 521 is beneficial to improve the stability of the movement of the screen body connector 40, reduce the possibility of the instantaneous impact force generated on the flexible screen 100 caused by the impact existing during the movement of the screen body connector 40, thus reducing the possibility of tearing of the flexible screen 100 due to being subjected to the instantaneous impact force.

The first threaded rod 511 and the second threaded rod 521 each includes a power input end 55 disposed close to the first support body 21, and the power input end 55 can rotate the first threaded rod 511 and the second threaded rod 521. The power assembly 50 further includes a servo motor or a stepping motor connected with the power input end 55. The power input end 55 may have a gear structure, and the power input end 55 of the first threaded rod 511 and the power input end 55 of the second threaded rod 521 engages with each other. Alternatively, the power input end 55 of the first threaded rod 511 and the power input end 55 of the second threaded rod 521 may be connected via a synchronous drive belt or a synchronous drive chain.

The synchronous rotation of the first threaded rod 511 and the second threaded rod 521 can ensure that the second support body 22 and the screen body connector 40 move simultaneously, so as to avoid as much as possible the phenomenon of the tearing caused by excessive stretching of the flexible screen 100 due to excessive tension applied by the second support body 22 onto the flexible screen 100 in a case where the second support body 22 protrudes whereas the screen body connector 40 does not move and unfold the flexible screen 100, when the first threaded rod 511 rotates prior to the second threaded rod 521. Alternatively, it is possible to avoid the phenomenon of the tearing caused by excessive stretching of the flexible screen 100 due to excessive tension applied by the second support body 22 onto the flexible screen 100 in a case where the second support body 22 is not retracted whereas the screen body connector 40 has started to move to fold the flexible screen 100, when the second threaded rod 521 rotates prior to the first threaded rod 511.

In some embodiments, as shown in FIG. 5, the first driving mechanism 51 further includes a first guide rail 512 extending along the first direction X and slidably connected with the first connecting seat 56. The first guide rail 512 penetrates through the first connecting seat 56, and is connected and fixed to the first mounting seat 53 and the second mounting seat 54 at two ends in the first direction X. When the second support body 22 moves in the first direction X, the first guide rail 512 moves synchronously with the second support body 22 relative to the first support body 21. The provision of the first guide rail 512 can improve the stability of movement of the second support body 22, thereby reducing the possibility of accidental damage to the flexible screen 100 caused by the adverse impact of the second support body 22 on the flexible screen 100. In some embodiments, the second driving mechanism 52 further includes a second guide rail 522 extending along the first direction X and slidably connected with the second connecting seat 57. The second guide rail 522 penetrates through the second connecting seat 57, and is connected and fixed to the first mounting seat 53 and the second mounting seat 54 at two ends in the first direction X. When the second support body 22 moves in the first direction X, the second guide rail 522 moves synchronously with the second support body 22. The provision of the second guide rail 522 can improve the stability of the movement of the screen body connector 40, thereby reducing the possibility of accidental damage to the flexible screen 100 caused by the adverse impact of the screen body connector 40 on the flexible screen 100.

Figure 7:
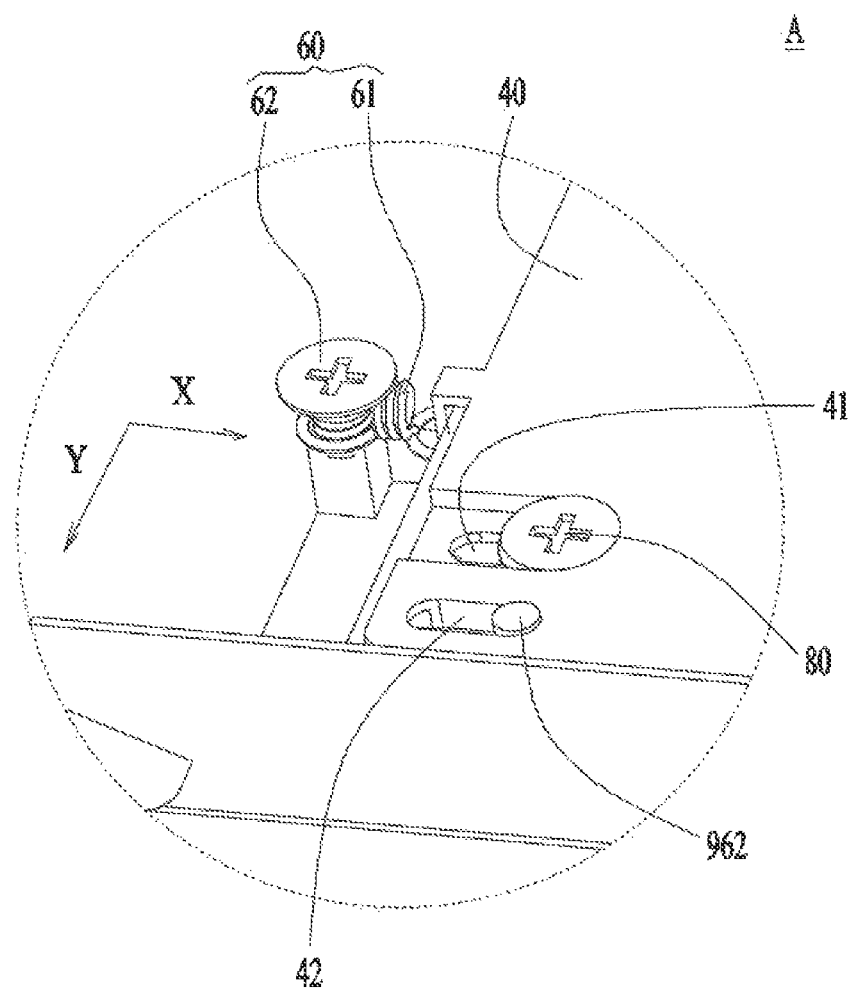
FIG. 7 is an enlarged schematic view at A in FIG. 6.

In some optional embodiments, the first guide rail 512 and the second guide rail 522 are spaced in the second direction Y and are located outside of the first threaded rod 511 and the second threaded rod 521, respectively. In some embodiments, as shown in FIGS. 6 and 7, the support structural member 10 further includes a tensioning assembly 60. The tensioning assembly 60 is connected to the second support body 22 and the screen body connector 40. The tensioning assembly 60 is configured to tension the screen body connector 40 in the first direction X, to slightly adjust the tension force of the flexible screen 100 by the screen body connector 40, further ensuring that the flexible screen 100 remains in a tight and flat state, and improving the display effect. In some optional embodiments, the tensioning assembly 60 includes an elastic member 61. One end of the elastic member 61 is connected to the second support body 22, and the other end of the elastic member 61 is connected to the screen body connector 40. The elastic element 61 is configured to apply a tensile stress in the first direction X to the screen body connector 40. When the second support body 22 protrudes relative to the first support body 21 and the screen body connector 40 moves away from the first support body 21, the elastic element 61 is elongated, and the elastic potential energy to be accumulated therein will increase. Optionally, the elastic member 61 may be a spring or a rubber strip. By way of example, one end of the elastic member 61 is connected and fixed to the second support body 22 by a screw 62, and the other end of the elastic member 61 is hung onto the screen body connector 40. In some optional embodiments, in the embodiment where the first driving mechanism 51 drives the second support body 22 to move or the second driving mechanism 52 drives the screen body connector 40 to move, there may be a clearance in the first direction X between the first threaded rod 511 and the first support body 21 or between the second threaded rod 521 and the screen body connector 40. As a result, the first threaded rod 511 is required to rotate a certain angle to compensate the clearance, causing the second support 22 to fail to move synchronously; similarly, the second threaded rod 521 is required to rotate to a certain angle to compensate the clearance, causing the screen body connector 40 to fail to move synchronously. Under the action of the elastic element 61, it is possible to eliminate the adverse influence caused by the clearance and to ensure the smooth and synchronous transmission.

Figure 8:
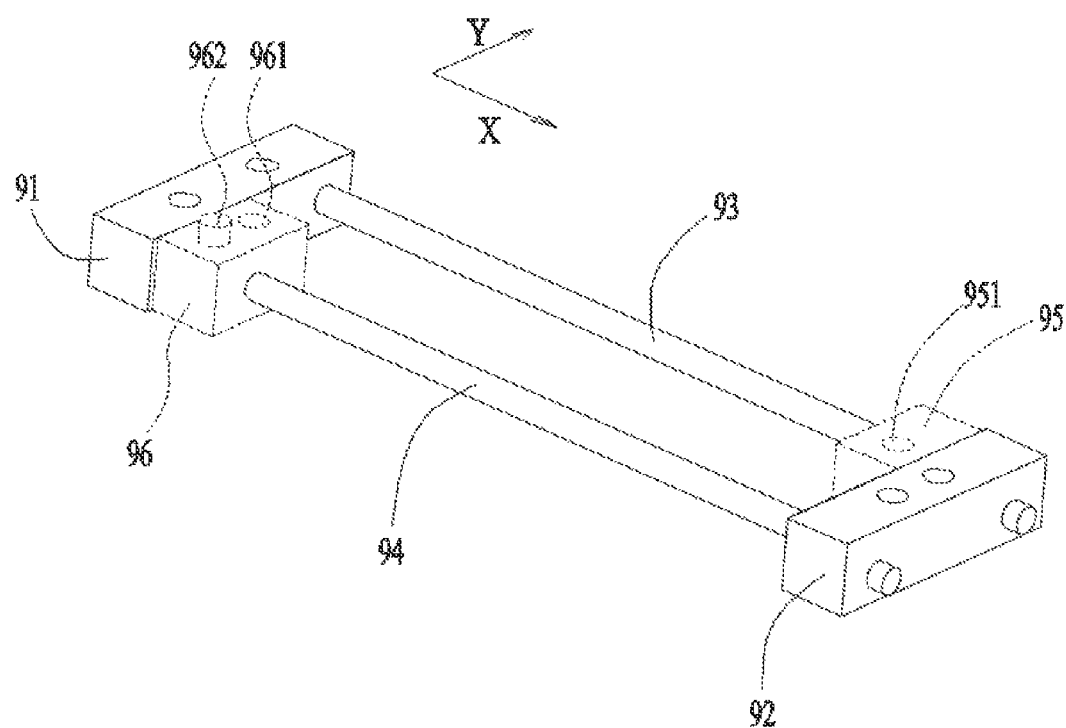
FIG. 8 is a schematic view of a guide assembly according to an embodiment of this disclosure.

In some embodiments, as shown in FIGS. 6 and 8, the support structural member 10 further includes a guide assembly 90 disposed on the inner surface 20b of the support frame 20 and connected with the second support body 22 and the screen body connector 40. The guide assembly 90 and the power assembly 50 are located at two ends of the support frame 20 in the second direction Y The guide assembly 90 is configured to provide guidance for the second support body 22 and the screen body connector 40 in the first direction X, thereby further improving the smoothness of the movement of the second support body 22 and the screen body connector 40, and reducing the possibility of adverse impact on the flexible screen 100 connected between the screen body fixing member 30 and the screen body connector 40.

In some optional embodiments, the guide assembly 90 includes: a first guide rail fixing seat 91 and a second guide rail fixing seat 92 which are spaced in the first direction X, and a third guide rail 93 and a fourth guide rail 94 fixedly connected to the first guide rail fixing seat 91 and the second guide rail fixing seat 92 at their respective two ends. The first guide rail fixing seat 91 and the second guide rail fixing seat 92 are fixed to the second support body 22. When the second support body 22 moves in the first direction X, the second support body 22, the first guide rail fixing seat 91, the second guide rail fixing seat 92, the third guide rail 93 and the fourth guide rail 94 are all movable synchronously in the first direction X. The guide assembly 90 further includes: a first guide seat 95 which is slidably connected with the third guide rail 93, and a second guide seat 96 which is sleeved onto the fourth guide rail 94 and slidably connected with the fourth guide rail 94. The first support body 21 is fixedly connected with the first guide seat 95. The first guide seat 95 includes: a convex column projecting toward the second support body 22 to be fixedly connected with the second support body 22, and a first connecting hole 951 penetrating in the third direction. The second guide seat 96 includes: a second connecting hole 961 penetrating in the third direction, and a second limiting convex column 962 projecting toward the screen body connector 40. The second limiting convex column 962 is in a snap-fit with the second strip hole 42 disposed at the corresponding end of the screen body connector 40. With the fixed connection between the fastener 80 and the first strip hole 41 disposed at the corresponding end of the screen body connector 40 and the second connecting hole 961 of the second guide seat 96, the fixed connection between the screen body connector 40 and the second guide seat 96 can be achieved. When the second threaded rod 521 drives the screen body connector 40 to move in the first direction X, the screen body connector 40 drives the second guide seat 96 to move along the fourth guide rail 94, that is, to move the second guide seat 96 from the first guide rail fixing seat 91 to the second guide rail fixing seat 92, or from the second guide rail fixing seat 92 to the first guide rail fixing seat 91.

In some embodiments, as shown in FIG. 3, the support frame 20 further includes a rolling shaft 25. The rolling shaft 25 is configured to support the flexible screen 100. The rolling shaft 25 is disposed at an end away from the first support body 21 inside the second support body 22. The rolling shaft 25 is rotatably connected to the second support body 22 at two opposite ends in the second direction Y One end of the flexible screen 100 is connected and fixed to the screen body fixing member 30, and the middle portion of the flexible screen 100 is bent and abuts against the rolling shaft 25. The other end of the flexible screen 100 bypassing the rolling shaft 25 is connected with the screen body connector 40. The rolling shaft 25 can reduce the resistance during the unfolding or folding of the flexible screen 100, and can also reduce the possibility of friction damage caused by the direct contact between the flexible screen 100 and the second support body 22.

Figure 9:
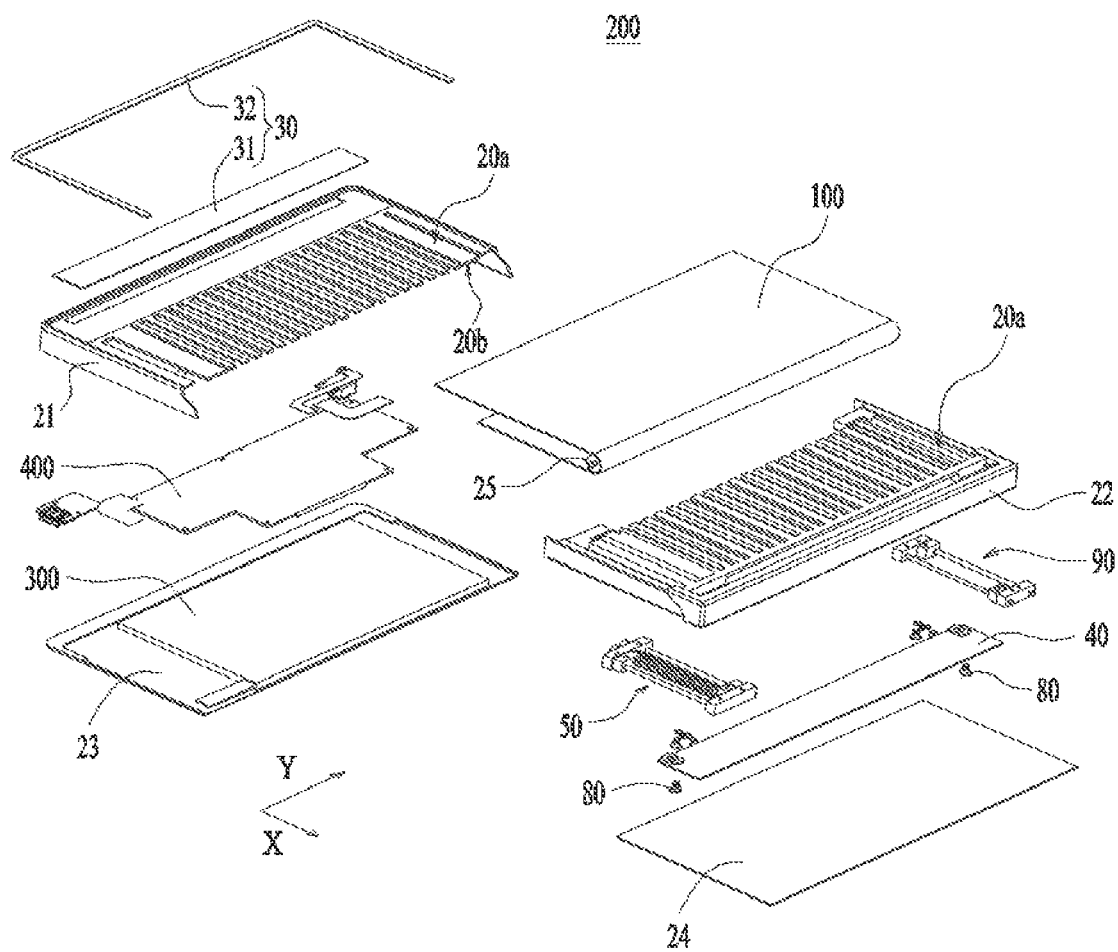
FIG. 9 is a schematic exploded view of a partial structure of a display device according to an embodiment of this disclosure.

As shown in FIG. 9, the embodiment of this disclosure also provides a display device 200. The display device 200 includes a flexible screen 100 and the support structural member 10 in the above embodiments. The flexible screen 100 is configured to display images. The screen body support surface 20a of the support frame 20 is configured to support the flexible screen 100. One end of the flexible screen 100 is connected to the screen body fixing member 30, and the other end thereof is bent to be received in the second support body 22 and is connected to the screen body connector 40. When the power assembly 50 drives the second support body 22 to protrude or retract relative to the first support body 21 and to make the screen body connector 40 and the second support body 22 move simultaneously in the first direction X, the portion of the flexible screen 100 received in the second support body 22 can be unfolded or folded to adjust the size of the exposed display area of the flexible screen 100. In this embodiment, the display device 200 may be a mobile phone. In other optional embodiments of this disclosure, the display device 200 may also be any device with display function, such as a tablet computer, a notebook, a display, or the like.

In some embodiments, the display device 200 further includes a battery 300 and a circuit board 400. The battery 300 and the circuit board 400 are both located on a side of the inner surface 20b of the support frame 20 and are disposed correspondingly to the first support body 21. The battery 300 is configured to provide power for the display device 200, and the circuit board 400 is configured to collect, process and analyze data to ensure that the display device 200 can display images normally.

Since the display device 200 includes the support structural member 10 described in any of the above embodiments, the display device 200 has the beneficial effect of the support structural member 10 described in any of the above embodiments, which will not be described in detail here.

What is claimed is:

1. A support structural member for a display device, comprising:
a support frame comprising a screen body support surface and an inner surface opposite to the screen body support surface, the support frame comprising a first support body and a second support body, and the second support body being movably connected to the first support body in a first direction;
a screen body connector disposed on the support frame and configured to guide a screen body to be unfolded or folded, the screen body connector being movably connected to the second support body;
a power assembly disposed on the support frame, the second support body and the screen body connector being both connected to the power assembly, and the power assembly driving the second support body to protrude or retract relative to the first support body, and enabling the screen body connector and the second support body to move simultaneously in the first direction; and
a tensioning assembly connected with the second support body and the screen body connector.

2. The support structural member as claimed in claim 1, further comprising:
a screen body fixing member disposed on a side of the screen body support surface of the support frame and including a fixing plate connected to the first support body, and the power assembly is disposed on a side of the inner surface of the support frame.

3. The support structural member as claimed in claim 2, wherein the power assembly comprises a first driving mechanism connected with the second support body and driving the second support body to move in the first direction and a second driving mechanism connected with the screen body connector and driving the screen body connector to move in the first direction.

4. The support structural member as claimed in claim 3, wherein the first driving mechanism comprises a first threaded rod rotatably connected to the second support body and threadly connected with the first support body, when the first threaded rod rotates, the first threaded rod and the second support body move synchronously relative to the first support body in the first direction, to enable the second support body to protrude or retract relative to the first support body.

5. The support structural member as claimed in claim 4, wherein the power assembly further comprises a first connecting seat fixedly connected to the first support body, and the first connecting seat is threadly connected with the first threaded rod.

6. The support structural member as claimed in claim 4, wherein the second driving mechanism comprises a second threaded rod rotatably connected to the second support body, the screen body connector is connected to the second threaded rod, and when the second threaded rod rotates relative to the second support body, the second threaded rod drives the screen body connector to move in the first direction.

7. The support structural member as claimed in claim 6, wherein the screen body connector comprises a second connecting seat, the screen body connector is fixedly connected with the second connecting seat, and the second connecting seat is threadly connected with the second threaded rod.

8. The support structural member as claimed in claim 7, further comprising:
a fastener for fixing the screen body connector and the second connecting seat, the screen body connector comprises a first strip hole and a second strip hole extending along the first direction, the second connecting seat comprises a first limiting convex column and a second fixing hole, the fastener penetrates through the first strip hole of the screen body connector and the second fixing hole of the second connecting seat, and the first limiting convex column of the second connecting seat extends into the second strip hole of the screen body connector.

9. The support structural member as claimed in claim 6, wherein the first threaded rod and the second threaded rod comprise a power input end, and the power input end drives the first threaded rod and the second threaded rod to rotate synchronously.

10. The support structural member as claimed in claim 7, wherein the power assembly further comprises a first mounting seat and a second mounting seat, the first mounting seat and the second mounting seat are disposed on the second support body and spaced in the first direction, and two ends of each of the first threaded rod and the second threaded rod are connected to the first mounting seat and the second mounting seat, respectively, and the first threaded rod and the second threaded rod are spaced in a second direction perpendicular to the first direction.

11. The support structural member as claimed in claim 10, wherein the first driving mechanism further comprises a first guide rail, the first guide rail extends along the first direction, two ends of the first guide rail are fixed to the first mounting seat and the second mounting seat, respectively, and the first support body is movably connected to the first guide rail.

12. The support structural member as claimed in claim 11, wherein the second driving mechanism further comprises a second guide rail, the second guide rail extends along the first direction, two ends of the second guide rail are fixed to the first mounting seat and the second mounting seat, respectively, and the screen body connector is movably connected to the second guide rail.

13. The support structural member as claimed in claim 1, wherein the support frame further comprises a rolling shaft, the rolling shaft is disposed at an end of the second support body away from the first support body, the rolling shaft extends in a second direction perpendicular to the first direction, and two ends of the rolling shaft are rotatably connected to the second support body.

14. The support structural member as claimed in claim 2, wherein tensioning assembly is configured to tension the screen body connector in the first direction.

15. The support structural member as claimed in claim 14, wherein the tensioning assembly comprises an elastic member, one end of the elastic member is connected to the second support body, and the other end of the elastic member is connected to the screen body connector, and the elastic member is configured to apply a tensile stress in the first direction to the screen body connector.

16. The support structural member as claimed in claim 2, further comprising:
a guide assembly disposed on a side of the inner surface of the support frame, wherein the second support body and the screen body connector are both connected with the guide assembly, the guide assembly and the power assembly are spaced in a direction perpendicular to a moving direction of the second support body, and the guide assembly is configured to provide guidance for the second support body and the screen body connector in the first direction.

17. The support structural member as claimed in claim 16, wherein the guide assembly comprises
a first guide rail fixing seat, a second guide rail fixing seat, a third guide rail and a fourth guide rail, the first guide rail fixing seat and the second guide rail fixing seat are disposed on the second support body and spaced in the first direction, two ends of each of the third guide rail and the fourth guide rail are connected to the first guide rail fixing seat and the second guide rail fixing seat, respectively, the first support body is movably connected to the third guide rail, and the screen body connector is movably connected to the fourth guide rail.

18. A display device, comprising:
a flexible screen; and
the support structural member as claimed in claim 2, the screen body support surface being configured to support the flexible screen, one end of the flexible screen being connected to the screen body fixing member, and the other end of the flexible screen being bent to be received in the second support body and being connected to the screen body connector, the power assembly driving the second support body to protrude or retract relative to the first support body, and enabling a portion of the flexible screen received in the second support body to be unfolded or folded when the screen body connector and the second support body move simultaneously in the first direction.

* * * * *